United States Patent [19]

Hamano

[11] Patent Number: 4,984,680
[45] Date of Patent: Jan. 15, 1991

[54] ARTICLE TRANSFER APPARATUS WITH CLAMPER

[75] Inventor: Itirou Hamano, Ishikawa, Japan
[73] Assignee: Shibuya Kogyo Co., Ltd., Ishikawa, Japan
[21] Appl. No.: 368,600
[22] Filed: Jun. 20, 1989

[30] Foreign Application Priority Data

Oct. 26, 1988 [JP] Japan .................................. 63-270378
Nov. 30, 1988 [JP] Japan .................................. 63-302598

[51] Int. Cl.$^5$ .............................................. B65G 47/86
[52] U.S. Cl. .................................................. 198/803.9
[58] Field of Search ................ 198/470.1, 803.7, 803.9

[56] References Cited

U.S. PATENT DOCUMENTS 1,230,771 6/1917 Pflanze ............................. 198/803.9
2,984,337 5/1961 Couch et al. ...................... 198/803.7
4,124,112 11/1978 Mohney et al. .

FOREIGN PATENT DOCUMENTS

62-52096 3/1987 Japan .

Primary Examiner—Joseph E. Valenza
Attorney, Agent, or Firm—Flynn, Thiel, Boutell & Tanis

[57] ABSTRACT

The invention relates to an article transfer apparatus with clamper which rotationally transfers an article, held between a pair of clamp arms, as a rotatable body rotates. The clamp arms are driven for swinging motion in response to the rotation of clamp shafts, which are driven for rotation by a cam mechanism. An adjusting mechanism controls the angle through which the clamp shafts rotate until a given angle position of rotatable body is reached, thereby controlling the degree of swinging motion or opening between the pair of clamp arms so as to permit articles of different sizes to be grasped or released at a given position.

9 Claims, 10 Drawing Sheets

ARTICLE TRANSFER APPARATUS WITH CLAMPER

FIELD OF THE INVENTION

The invention relates to an article transfer apparatus with clamper provided with a pair of clamp arms which are effective to hold an article therebetween, and more particularly, to such apparatus in which the article which is held between the clamp arms are rotationally driven as a rotatable body rotates.

DESCRIPTION OF THE PRIOR ART

An article transfer apparatus with clamper of the kind described is known in the art, as disclosed in U.S. Pat. No. 4,124,112, including a frame, a rotatable body which is rotatably mounted on the frame, a pair of clamp shafts rotatably mounted on the rotatable body for rotation in opposite directions from each other, a pair of clamp arms mounted on respective clamp shafts for swinging motion, and a cam mechanism for actuating the clamp arms for swinging motion.

In the described arrangement, the positions where the pair of clamp arms are driven for movement toward and away from each other are uniquely defined by a cam profile of the cam member. Accordingly, if a cam profile is chosen which enables a large sized article to be held at a given position by the pair of clamp arms as they are closed, an article of a smaller size cannot be held at a corresponding position, but it is necessary that the clamp arms be swung further toward their closed position before such article can be held, thus resulting in a different position where the article is held between the pair of clamp arms. The same applies when the article is to be released. Thus, if the cam profile is defined so that a large sized article can be released at a given position, an article having a smaller size will be released from the clamps at a different position.

To overcome this disadvantage, there has been proposed an arrangement as disclosed in Japanese Laid-Open patent application Ser. No. 52,096/1987 in which a pair of clamp arms mounted on the rotatable body are urged toward each other by a spring. A cam member is mounted on the rotatable body so as to be vertically movable therealong and is formed with a conical portion at its top which is interposed between the both clamp arms. The cam member is disposed to be capable of rolling along a cylindrical cam rail which is disposed on the frame and which is vertically movable.

With this arrangement, the stroke through which the cam member moves vertically as the rotatable member rotates is defined by the cam profile of the cam rail so that the positions where the clamp arms are driven toward and away from each other can be uniquely defined. The spacing between the both clamp arms at a corresponding angular position can be adjusted by moving the cam rail up and down, whereby article of different sizes can be seized and released at a common angular position by choosing the spacing in accordance with the size of each particular article.

However, when the clamp arms are actuated for swinging motion toward or away from each other by vertically driving the cam member which is interposed between the pair of clamp arms, it follows that the clamp arms will move in a direction during their swinging motion which is perpendicular to a direction in which the cam member is driven up and down, giving rise to the likelihood that a bearing associated with the clamp arm be subject to a rattling effect or that areas of contact between the clamp arms and the cam member are susceptible to abrasion.

In a transfer apparatus of the kind described, where circular articles of differing diameters are to be held, the center of such circular article will shift toward or away from the clamp shaft depending on the diameter of the article since the swinging motion of each of the pair of clamp arms represents an arcuate motion which is centered about the center of rotation of the respective clamp shaft, and it has been considered in the prior art that such shift occurs substantially rectilinearly in a given direction.

When the center of a circular article which is held between the clamp arms shifts toward or away from the clamp shaft depending on the diameter thereof, as when a circular vessel is held between the clamp arms and rotationally driven as the rotatable body rotates to be delivered to a rotary filling machine located downstream, the position of such delivery will shift radially of the filling machine.

It then follows that if the shift is excessively large, the circular vessel will be prevented from being carried to a given position which is to be directly below a filling nozzle. If circular vessels which are served by the filling machine have greatly differing diameters, it has been required in the prior art practice that several different clamp arms be provided for use in accordance with the diameter of separate circular vessels. Each time the vessel is changed, the clamp arms must be replaced by those which correspond to a different vessel diameter, which is cumbersome.

SUMMARY OF THE INVENTION

In view of the foregoing, in accordance with the invention, the cam mechanism comprises a rocking lever which is mechanically coupled with the clamp shaft, a cam follower disposed on the rocking lever, and a cam member on the frame. The cam follower engages a cam surface of the cam member so as to cause the clamp shaft to rotate in response to a rocking motion of the rocking lever which follows the cam profile of the cam surface, thereby actuating the pair of clamp arms for swinging motion. In addition, a mechanism is provided for adjusting the amount of swinging motion of the pair of clamp arms which are connected to the clamp shafts by adjusting the angular position of the clamp shafts corresponding to a given angular position of the rotatable body.

The cam surface of the cam member may be formed in a conical configuration, and the adjusting mechanism may comprise a mechanism which causes the cam member to move up and down. In this instance, the pair of clamp arms are driven for swinging motion in response to a rotary motion of the clamp shafts, and the clamp shafts are driven for rotation in response to a rocking motion of the rocking lever which is caused by the cam follower engaging the cam surface of the cam member, with consequence that no undue stresses are applied to the drive mechanism and an enhanced durability is assured.

By causing the conical cam surface to move up and down with respect to the cam follower, the latter can be displaced in the radial direction. In this manner, if the positions where the clamp arms are actuated as the rotatable body rotates are fixed by the cam profile of the cam member, it is possible to adjust the spacing between the both clamp arms at a given angular position through the movement of the cam member up and down.

Accordingly, by adjusting the spacing in accordance with the size of articles to be transferred, articles of differing sizes can be held and released at a common position.

When at least two cam members are provided so as to be rotatable relative to each other and the cam follower is caused to engage the cam surfaces of the both cam members in common, the adjusting mechanism may comprise rotary drive means which causes a relative rotational displacement of the cam members.

In this arrangement, where articles of an equal size are to be held and released by and from the clamp arms, there is no need to produce any rotational displacement between the at least two cam members, which may be engaged in common by the cam follower, and consequently any malfunctioning which may result from the abrasion of these members can be avoided.

When the size of articles is to be changed, a relative rotational displacement of the plurality of cam members is all that is required to adjust the positions where the pair of clamp arms are to be operated, thus enabling the spacing between the both clamp arms at the given angular position to be adjusted to a spacing which depends on the size of articles.

One of the clamp shafts may be divided into a plurality of clamp shaft sections which are axially displaceable, one associated with the clamp arm and the other associated with the rocking lever. I this instance, the adjusting mechanism may comprise reciprocatory drive means which causes an axial displacement of the clamp shaft sections, and cam means which causes a rotational displacement of the both clamp shaft sections in accordance with a relative axial displacement of the both clamp shaft sections.

With this arrangement, where articles of an equal size are to be held by and released from the clamp arms, there is no need for a displacement of the clamp shaft sections by the reciprocatory drive means or no need for a phase adjustment by the associated cam means, thus improving the durability of the reciprocatory drive means and the cam means while at the same time eliminating any likelihood of malfunctioning of these means which may be caused by the abrasion.

When the size of articles is changed, the reciprocatory drive means may be utilized to displace adjacent clamp shaft sections axially relative to each other and the rotational phase of the both clamp shaft sections may be adjusted by the cam means in accordance with the relative displacement, so that the spacing between the both clamp arms may be controlled in accordance with the size of articles while assuming an equal angular position.

In order that the need to change clamp arms in accordance with the diameter of vessels when the vessels are changed may be reduced, each of the clamp arms may be formed with V-shaped surface, which is used to hold a circular article between it and a mating V-shaped surface, so that the center of a particualr circular article may be positioned on a point of intersection of bisectors of the V-shaped surfaces when grasping circular articles of different diameters. Taking an angle defined between the both clamp arms when the point of intersection is positioned most close to the clamp shaft as a reference angle, circular articles of a greater diameter may be held between the clamp arms at an angle therebetween which is greater than the reference angle while circular articles of a lesser diameter maybe held between the clamp arms at an angle therebetween which is less than the reference angle.

In this instance, when a circular article is held between the clamp arms at the reference angle, the center of the article will be positioned most close to the clamp shaft while either the center of an article of a greater diameter or the center of an article of a lesser diameter will be spaced from this most close position with respect to the clamp shaft.

Thus as the diameter of circular articles which are held between the clamp arms at angles greater than the reference angle is gradually reduced, the center of such circular article will shift toward the clamp shaft, and after the center has been shifted to a position most close to the clamp shaft at the reference angle, the center of a circular article will shift in the opposite direction, thus away from the clamp shaft. As a consequence, as compared with a conventional arrangement in which the center of a circular article shifts toward or away from the clamp shaft monotonously as the diameter of a circular article reduces, in the arrangement of the invention, the shift of a position between articles of a larger and a smaller diameter can be reduced, enabling the arrangement of the invention to serve an increased range of sizes of circular articles.

Above and other objects, features and advantages of the invention will become apparent from the following description of several embodiments thereof with reference to the attached drawings.

DETAILED DESCRIPTION OF EMBODIMENTS

Referring to the drawings, several embodiments of the invention will now be described. Initially referring to FIG. 1, a feed conveyor 1 conveys circular vessels 2 thereon, which are then conveyed by a timing screw 3 in synchronism with the operation of an article transfer apparatus 4 with clamper according to the invention to be grasped or held between a pair of clamp arms 5a, 5b at a given grasp position X.

Figure 1:
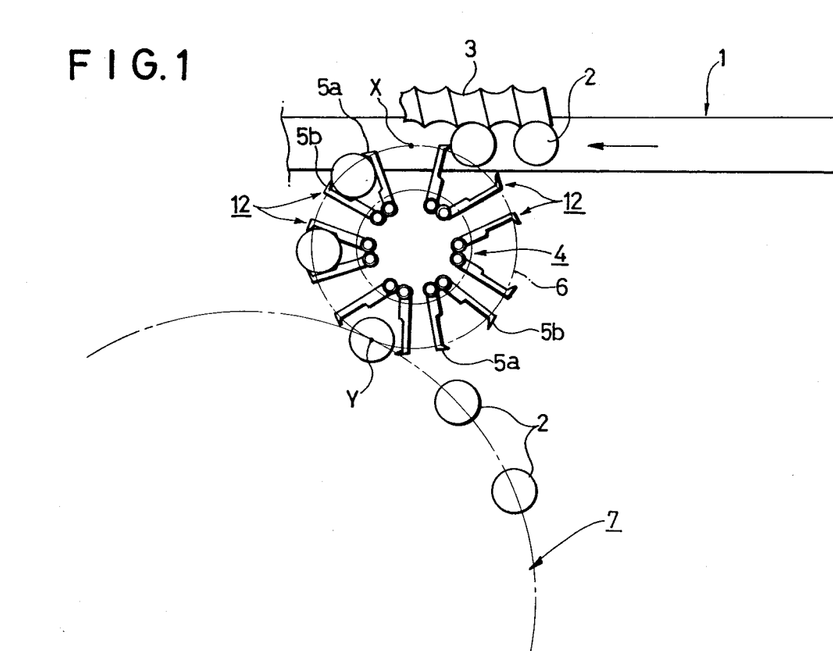
FIG. 1 is a plan view of one embodiment of the invention.

The circular vessel 2 which is held between the pair of clamp arms 5a, 5b is rotationally driven as a rotatable body 6, which constitutes an article transfer apparatus 4 with clamper, rotates to be released from between the clamp arms 5a, 5b at a given released position Y to be carried to a position immediately below a filling nozzle, not shown, of a rotary filling machine 7.

Figure 2:
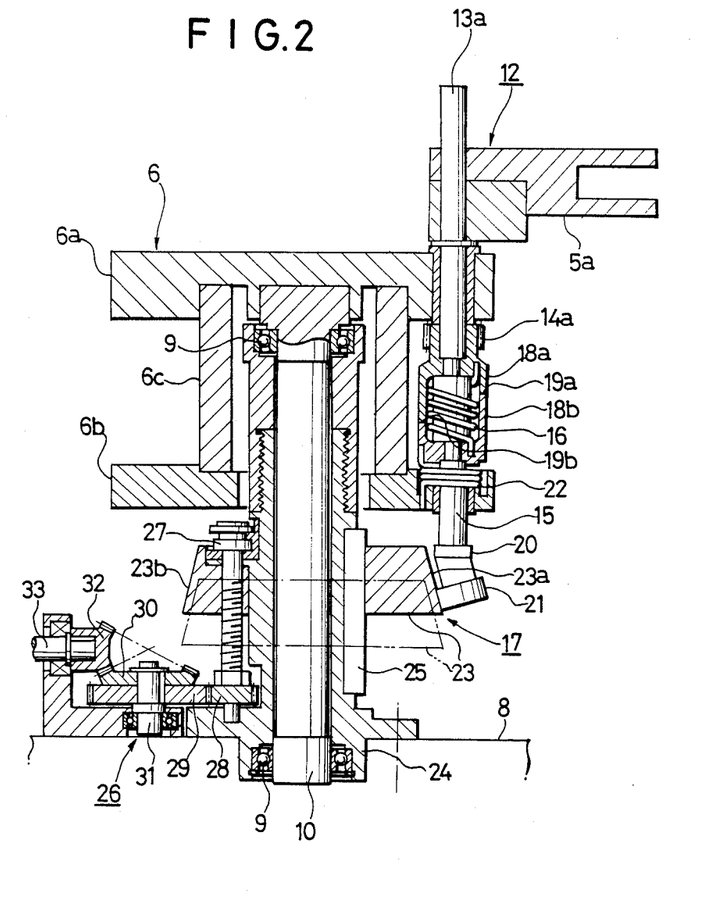
FIG. 2 is a side elevation, mostly in section, of part of the arrangement shown in FIG. 1.

As shown in FIG. 2, the apparatus 4 comprises a frame 8 having a bearing 9 disposed therein which rotatably supports a vertically extending rotary shaft 10. The rotatable body 6 referred to above is fixedly mounted on the top end of the rotary shaft 10. The lower end of the shaft 10 is connected to a motor, not shown. The rotatable body 6 comprises a circular top plate 6a directly secured to the upper end of the shaft 10, an annular bottom plate 6b disposed below the top plate 6a, and a cylindrical member 6c connecting the both plates.

Figure 3:
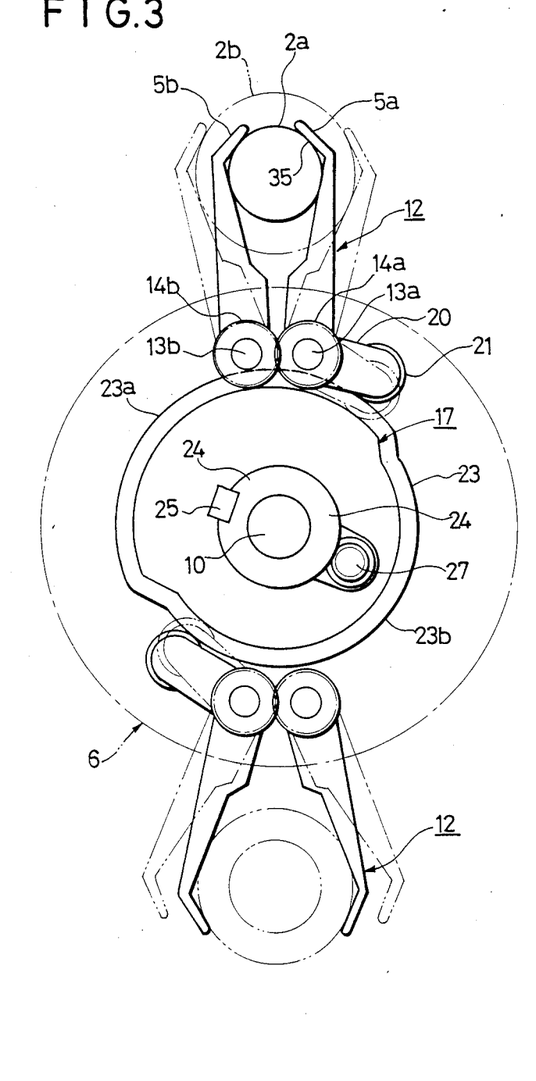
FIG. 3 is a top view of part of the arrangement shown in FIG. 2.

Along its outer periphery, the rotatable body 6 is provided with a plurality of clamp mechanisms 12 (see FIG. 1) at an equal interval, and as shown in FIGS. 2 and 3, each clamp mechanism 12 comprises a pair of vertically extending clamp shafts 13a, 13b which are journalled in the top plate 6a of the rotatable body 6, a pair of gears 14a, 14b mounted on the bottom of the respective clamp shafts and meshing with each other, and the pair of clamp arms 5a, 5b which are mounted on the top portion of the respective clamp shafts. Thus, by driving one of the clamp shafts, 13a, for rotation in forward or reverse direction, the both clamp shafts 13a, 13b may be driven for synchronous rotation in opposite directions from each other through the gears 14a, 14b, thus driving the pair of clamp arms 5a, 5b for swinging motion toward or away from each other.

A second clamp shaft 15 is rotatably journalled in the bottom plate 6b of the rotatable body 6 in axial alignment with one of the clamp shafts, 13a, and the both clamp shafts are connected together through a spring 16 interposed therebetween. The second clamp shaft 15 is adapted to be driven for rotation by a cam mechanism 17 to be described later.

Connecting tubes 18a, 18b are mounted on the lower end of the clamp shaft 13a and on the upper end of the second clamp shaft 15, respectively, so as to surround the spring 16, and the lower end face of the upper connecting tube 18a and the upper end face of the lower connecting tube 18b are formed with comb-shaped unevenness so that a projection 19a on one of the tubes fits in a recess 19b in the other tube with a circumferential clearance between the respective projections. The torsional resilience of the spring 16 is effective to urge the both connecting tubes 18a, 18b to rotate in opposite directions so that the clamp arms 5a, 5b are capable of holding the circular vessel 2 therebetween, thus normally maintaining them in an initial condition in which the projection 19a is resiliently urged against the wall surface of the recess 19b of the other tube.

A rocking lever 20 has its one end mounted on the lower end of the second clamp shaft 15 and its other end carries a cam follower 21 which forms part of a cam mechanism 17 to be described later. The second clamp shaft 15 is urged by a return spring 22 disposed between the lower connecting tube 18b and the bottom plate 6b in a direction to open the clamp arms 5a, 5b, whereby the cam follower 21 is brought into abutment against and engagement with a conical cam surface of a cam member 23 from the radially outside thereof.

As shown in FIG. 3, the cam member 23 includes an arcuate portion 23a of a greater diameter and another arcuate portion 23b of a reduced diameter. The arcuate portion 23a of a greater diameter is effective to cause the cam follower 21 to be displaced radially outward to thereby close the clamp arms 5a, 5b while the arcuate portion 23b of a reduced diameter is effective to cause the cam follower 21 to be displaced radially inward to open the clamp arms 5a, 5b.

Accordingly, when the cam mechanism 17 causes the second clamp shaft 15 to angularly drive the clamp arms 5a, 5b in a closing direction against the resilience of the spring 22, the connecting tubes 18a, 18b, the clamp shafts 13a, 13b and the clamp arms 5a, 5b are integrally driven for rotation while maintaining the initial condition mentioned above. When the clamp arms 5a, 5b ceases to be angularly driven upon holding the annular vessel 2 therebetween, if the second clamp shaft 15 further drives the clamp arms 5a, 5b in a closing direction, the projection 19a will be moved away from the recess 19b, and an increased twisting of the spring 16 from its initial condition permits a continued angular movement of the second clamp shaft 15.

On the other hand, when the second clamp shaft 15 is now driven for rotation in a direction to open the clamp arms 5a, 5b, if the clamp arms 5a, 5b has become bonded to the circular vessel 2 to prevent their separation from the vessel 2 for some reason, an engagement between the projection 19a and the recess 19b will be achieved when the initial condition is resumed to thereby interconnect the first clamp shaft 13a and the second clamp shaft 15 mechanically, thus allowing the clamp arms 5a, 5b to be forcibly separated from the vessel 2 under the resilience of the return spring 22.

Referring to FIG. 2, the cam member 23 is disposed to be vertically movable and in surrounding relationship with a cylindrical member 24 which is fixedly mounted on the frame 8 so as to surround the rotary shaft 10. The cylindrical member 24 is provided with a key member 24, which permits a vertical movement of the cam member 23, but prevents its rotation.

An elevating mechanism 26 which causes the cam member 23 to move up and down comprises a vertically extending screw shaft 27 threadably engaged with the cam member 23 and rotatably journalled in the cylindrical member 24, a vertical gear shaft 31 carrying a spur gear 29 which meshes with a spur gear 28 mounted on the screw shaft 27 and also carrying a bevel gear 30, and a horizontal drive shaft 33 carrying a bevel gear 32 which meshes with the bevel gear 30. The cam member 23 may be moved up and down by causing the horizontal drive shaft 33 to be driven for rotation in either forward or reverse direction by a motor, not shown, or manually.

Suppose that the apparatus 4 is employed to grasp and transfer a circular vessel 2b of an increased diameter, as indicated by phantom lines in FIG. 3, and that the elevating mechanism 26 has positioned the cam member 23 at its lower position shown in phantom lines shown in FIG. 2. At this time, the cam follower 21 is driven clockwise, as viewed in FIG. 3, along the conical cam surface of the cam member 23 under the resilience of the return spring 22, thus increasing the spacing between the pair of clamp arms 5a, 5b.

By contrast, when a circular vessel 2a of a reduced diameter shown in solid line in FIG. 3 is to be grasped, the elevating mechanism 26 positions the cam member 23 at its upper position shown in solid line in FIG. 2. In this position, the cam follower 21 is driven counterclockwise, as viewed in FIG. 3, along the conical cam surface of the cam member 23 under the resilience of the return spring 22, whereby the spacing between the pair of clamp arms 5a, 5b is reduced.

Consequently, it will be seen that by suitably adjusting the vertical position of the cam member 23, both vessels 2b and 2a of different diameters may be grasped at the given grasp position X and released at the given release position Y.

In addition, it will be seen that the swinging motion of the pair of clamp arms 5a, 5b is achieved through the rocking motion of the cam follower 21 along the cam surface of the cam member 23 as well as the radial rocking motion of the rocking lever 20, through the angular motion of the second clamp shaft 15 which results from the rocking motion of the rocking lever 20, and the angular drive of the clamp shafts 13a, 13b from the spring 16, and thus is achieved without applying undue stresses upon the associated drive mechanisms, thereby assuring an enhanced durability.

Figure 4:
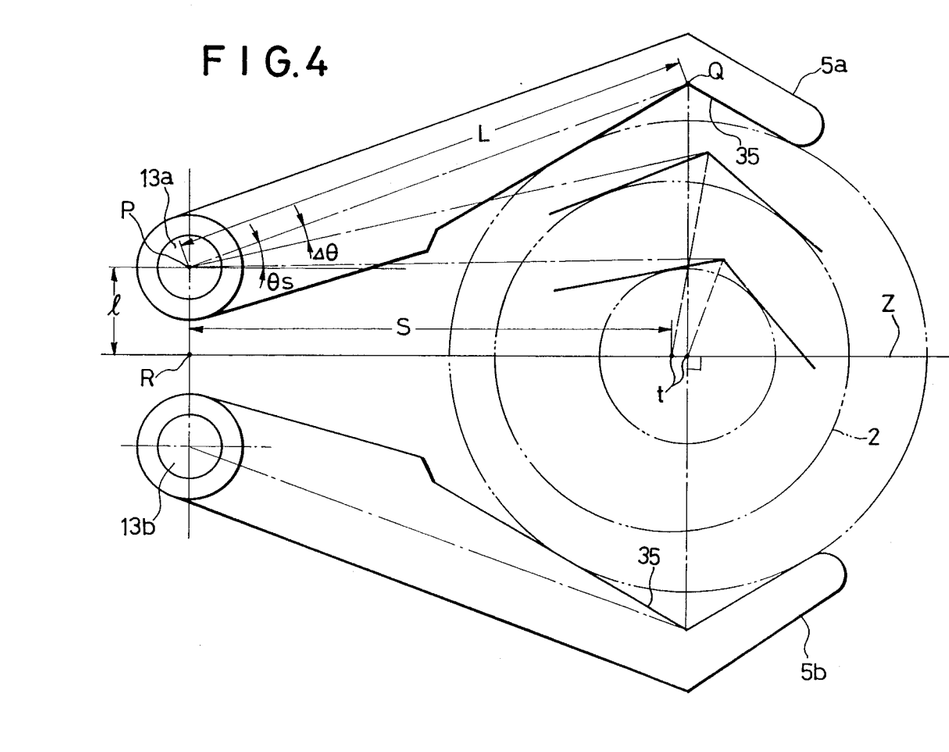
FIG. 4 is a diagram, in the form of a plan view, describing the relationship between an opening angle between clamp arms 5a, 5b and a displacement of a point of intersection t as the diameter of circular vessels 2 is changed.

Referring to FIG. 4, the clamp arms 5a, 5b are disposed symmetrically with respect to a centerline Z passing through a median point I between the clamp shafts 13a, 13b in a direction radially of the rotatable body 6, and are themselves formed to exhibit axis symmetry. Each of the clamp arms 5a, 5b is formed with V-shaped surface 35 which is effective to hold a circular vessel 2 therebetween and which is shaped such that the center of each circular article is positioned on a point of intersection t of bisectors of the opposite surfaces 35 if circular articles of different diameters are held therebetween. As a matter of course, the point t will be located on the centerline Z, and will shift toward or away from the respective clamp shafts 13a or 13b while remaining on the centerline Z in accordance with the opening angle defined between the clamp arms 5a, 5b as circular articles of different diameters are held therebetween. A relationship between the opening angle defined between the clamp arms 5a, 5b and a displacement of the point t as the diameter of the circular vessel 2 changes will be described. Referring to FIG. 4, a point representing the center of the clamp shaft 13a will be denoted by P, the apex of the V-shaped surface 35 of the clamp arm 5a by Q, the length of a line segment PQ by L and a distance between points P and R by l. In addition, an angle defined by the line segment PQ and a line drawn parallel to the centerline Z and passing through the center P when the bisector of the V-shaped surface 35 intersects with the centerline Z at right angles is denoted by $\theta$s.

Taking such positions as a reference, a distance between the point of intersection t and the median point R between the clamp shafts 13a, 13b when the clamp arm 5a is rotated through $\Delta\theta$ from the reference can be given as follows:

$$S = L \cdot \cos(\theta s - \Delta\theta) - \tan\Delta\theta \{l + L \cdot \sin(\theta s - \Delta\theta)\}$$

Figure 5:
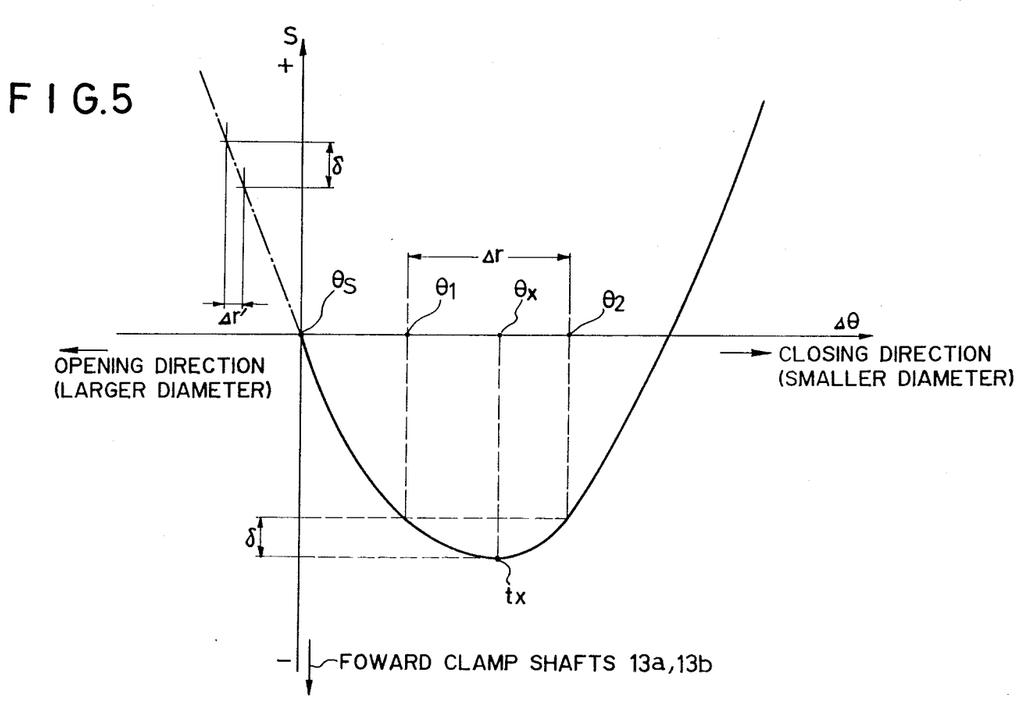
FIG. 5 graphically illustrates the relationship described in connection with FIG. 4.

This is graphically shown in FIG. 5. As will be appreciated, assuming that the circular vessel 2 which is grasped at the angle $\theta$s had a maximum diameter, a gradual decrease in the diameter of the circular vessel 2 or angularly driving the both clamp arms 5a, 5b in the closing direction to change the angle $\Delta\theta$ results in an initial decrease in the distance S until a minimum point tx is reached, whereupon the distance increases again. In other words, the center t of the circular vessel 2 moves close to the clamp shafts 13a, 13b as the diameter decreases, and after it has moved past the minimum point tx, the center t then moves away from the clamp shafts. In the present embodiment, the opening angle $\theta$x of the clamp arms where the minimum point tx is reached is chosen as a reference angle. An opening angle $\theta_1$ greater than the reference angle $\theta$x is used to grasp circular articles of a greater diameter while an angle $\theta_2$ less than the reference angle $\theta$x is used to grasp circular articles of a lesser diameter. As a consequence of this, if a difference $\Delta$r between the diameters of different articles is large, a corresponding shift $\delta$ of the center t of the circular vessels will be reduced. In other words, a permissible shift $\delta$ of a given magnitude allows for a greater difference $\Delta$r in the diameter, meaning that the apparatus is capable of serving a broader range of vessels.

By contract, in the prior art practice, a range of diameters which can be served by a single apparatus does not v include the minimum point tx, and hence the difference $\Delta$r' in a diameter between different articles for a given shift $\delta$ is greatly reduced, with result that whenever circular vessels of significantly different diameters are used, the clamp arms had to be changed.

Referring to FIGS. 6 to 9, there is shown a second embodiment of the invention, and in this embodiment, a rocking lever 120 is directly mounted on the lower end of a clamp shaft 113a which corresponds to the clamp shaft 13a mentioned previously. A return spring 122 is disposed between the rocking lever 120 and a rotatable body 106 to urge the clamp shaft 113a to rotate in its closing direction, thereby causing a cam follower 121 mounted on the rocking lever 120 to engage with cam surfaces, defined on the outer periphery of a pair of cam members 140, 141 which are disposed vertically one above another, in common.

Figure 6:
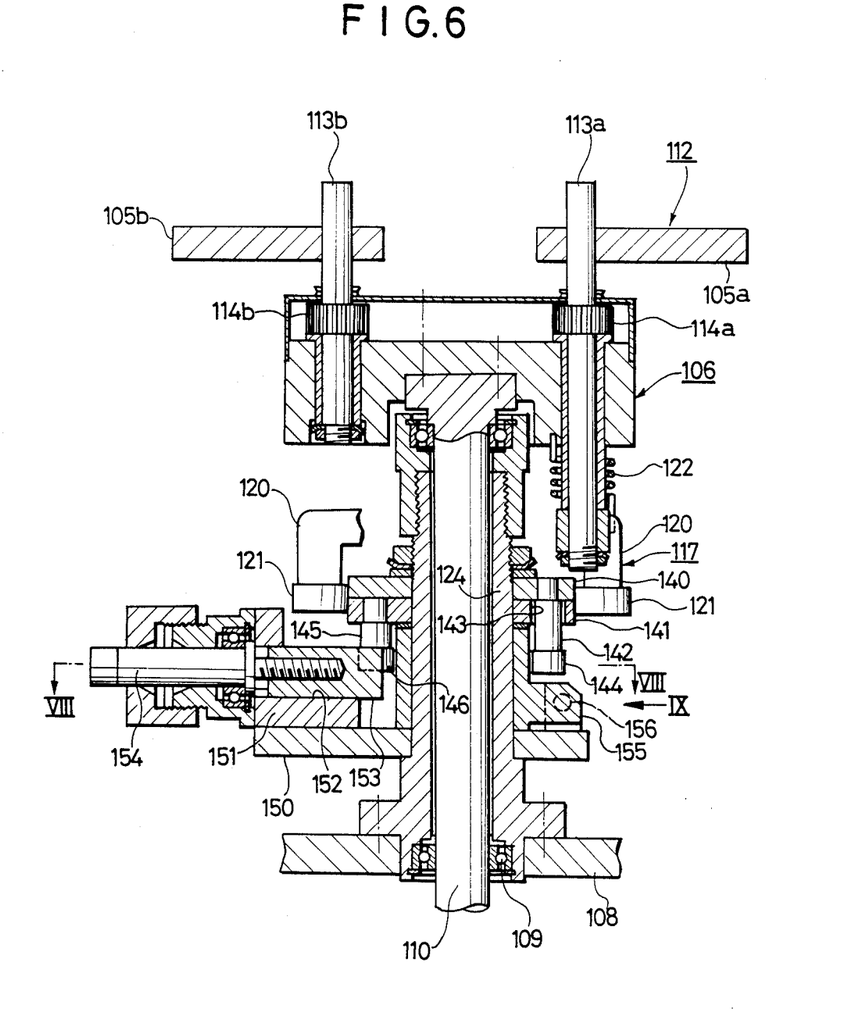
FIG. 6 is a side elevation, mostly in section, of another embodiment of the invention.
Figure 7:
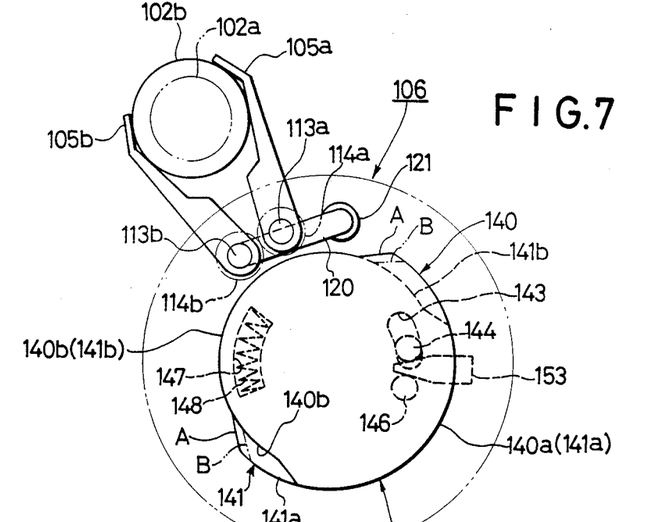
FIG. 7 is a schematic top view of part of the arrangement shown in FIG. 6.

The cam members 140, 141 include arcuate portions 140a, 141a of an increased diameter and arcuate portions 140b, 141b of a reduced diameter, respectively, each in an identical configuration. The arcuate portions 140a, 141aof an increased diameter are effective to cause the cam follower 121 to be displaced radially outward against the resilience of the return spring 122 to open clamp arms 105a, 105b while the arcuate portions 140b, 141b of a reduced diameter are effective to cause the clamp arms 105a, 105b to be closed under the resilience of the return spring 122.

The pair of cam members 140, 141 which form a vertically spaced pair are disposed offset from each other by a given amount as viewed in the circumferential direction so that as long as the cam follower 121 is maintained in engagement with at least one of the arcuate cam surfaces 140a, 141a of an increased diameter, the clamp arms 105a, 105b can be maintained open.

The pair of cam members 140, 141 are rotatably disposed around a cylindrical member 124 which is disposed in surrounding relationship with a rotary shaft 110 and fixedly mounted on a frame 108. A vertically extending connecting rod 142 is fixedly mounted on the upper cam member 140 and extends through an arcuate groove 143 formed in the lower cam member 141 to project below it, with a cam follower 144 mounted on its lower end. A vertically extending connecting rod 145 is fixedly mounted on the lower cam member 141 and carries a cam follower 146 thereon at its lower end at the same elevation as the cam follower 144.

The opposing surfaces of the pair of cam members 140, 141 are formed with arcuate grooves 147, in which a compression spring 148 is disposed to urge the both cam members 140, 141 for rotation in opposite directions from each other. Thus, under a free condition, the cam followers 144, 146 are in abutment against each other.

The cylindrical member 124 which is fixedly mounted on the frame 108 carries a fixing plate 150 on which a movable plate 151 is disposed so as to be rotatable about the cylindrical member 124.

Figure 8:
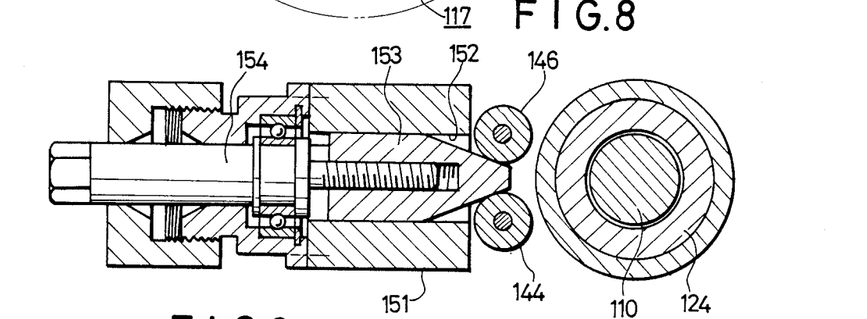
FIG. 8 is a view of the arrangement shown in FIG. 6, illustrating a section taken along the line VIII–VIII shown in FIG. 6.

As shown in FIGS. 6 and 8, the movable plate 151 is formed with a radial groove 152, in which a cam member 153 having a front end which is triangular in section is slidably engaged, with the front end being pressed into a clearance between the pair of cam followers 144, 146. A threaded shaft 154 is rotatably journalled on the movable plate 151 and is threadably engaged with the cam member 153 so that the rotation of the threaded bolt 154 is effective to cause a radial displacement of the cam member 153, thus rotationally displacing the pair of cam members 140, 141, in opposite directions from each other depending on the radial position of the cam member 153.

Figure 9:
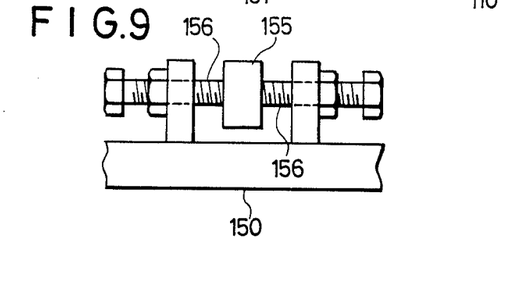
FIG. 9 is a side elevation of the arrangement shown in FIG. 6, as viewed in a direction indicated by an arrow IX.

In addition, at a given location, the movable plate 151 is formed with a projection 155 which extends radially outward, and as shown in FIG. 9, the projection 155 is disposed between a pair of adjusting screws 156 which are laterally spaced apart and disposed on the fixing plate 150. By operating the screws 156 to move the movable plate 151 angularly, circumferential position of the cam member 153 may be adjusted, thus in turn adjusting the center position of the pair of cam members 140, 141.

In other respects, the arrangement is similar to that of the first embodiment, and accordingly corresponding parts are designated by like reference numerals as used in the first embodiment, to which 100 are added.

When transferring articles using the article transfer apparatus of this embodiment, the movable plate 151 is angularly moved initially by utilizing the pair of laterally spaced adjusting screws 156 to position the pair of cam members 140, 141. When a vessel 102b of a greater diameter is to be transferred, the threaded bolt 154 is turned to cause the cam member 153 to be displaced radially inward to thereby increase the spacing between the cam followers 144, 146 to rotate the pair of vertically spaced cam members 140, 141 at a position indicated by a solid line A in FIG. 7. By contrast, when transferring a vessel 102a of a smaller diameter, the threaded bolt 154 is turned to cause the cam member 153 to be displaced radially outward to thereby reduce the spacing between the pair of cam followers 144, 146 which engage the cam member 153, thus locating the pair of cam members 140, 141 at a position B indicated by phantom lines in FIG. 7.

As will be understood from the solid line position A and the phantom line position B of the cam members 140, 141, the cam follower 121 mounted on the rocking lever 120 will shift from the arcuate cam surface 140a of an increased diameter to the arcuate cam surface 140b of a reduced diameter of the upper cam member 140 at an earlier timing as compared with the timing associated with the transfer of the vessel 102b of a greater diameter, whereby the both vessels 102a, 102b of different diameters can be grasped at a common grasp position X.

The cam follower 121 will shift from the arcuate cam surface 141b of a reduced diameter to the arcuate cam surface 141a of an increased diameter of the lower cam member 141 at a retarded timing, whereby the both vessels 102a, 102b of different diameters can be released at a common release position Y.

The cam member 153 may be formed with a groove cam, engaged by cam followers 144, 146 on the cam members 140, 141, thereby allowing the angular position of the cam members 140, 141 to be adjusted in accordance with a reciprocating movement of the cam member 153.

Alternatively, while the angular position of the pair of cam members 140, 141 is simultaneously controlled by the single cam member 153, it should be understood that the angular position of the cam members may be separately adjusted.

Figure 10:
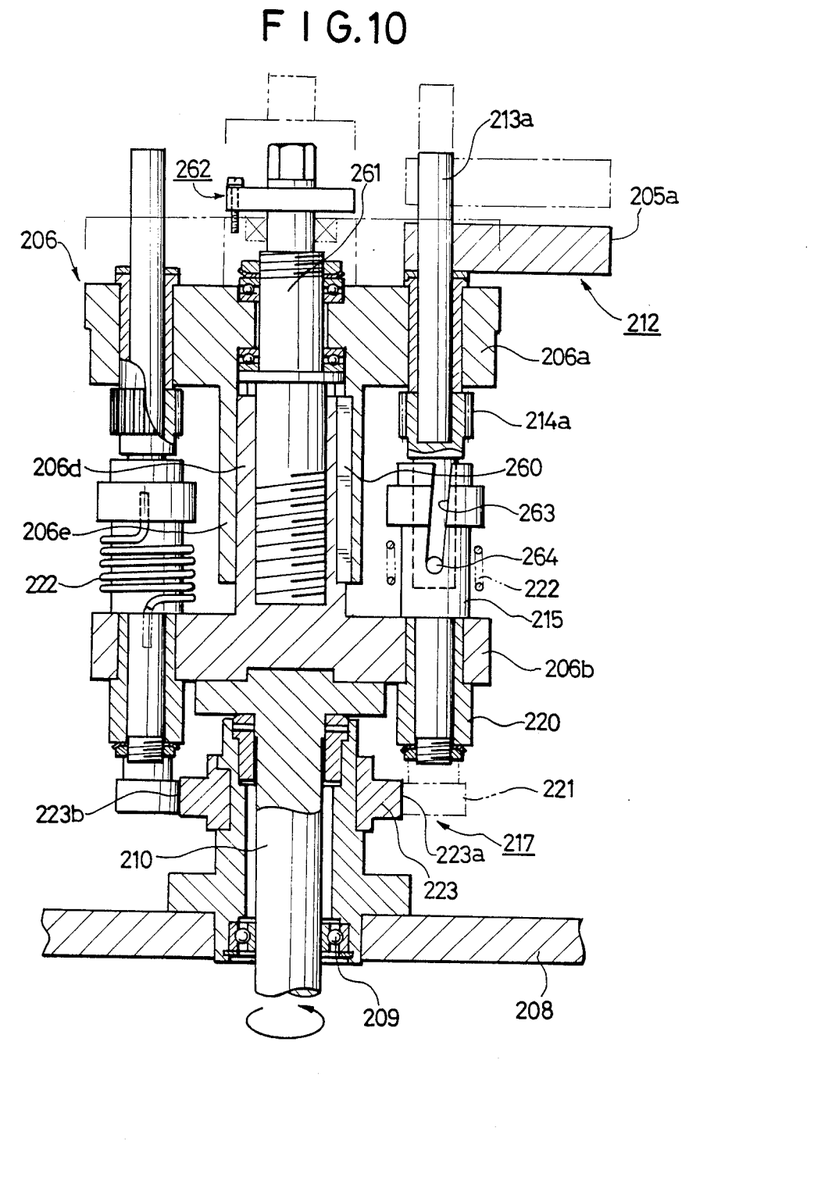
FIG. 10 is a side elevation, mostly in section, of a further embodiment of the invention.
Figure 11:
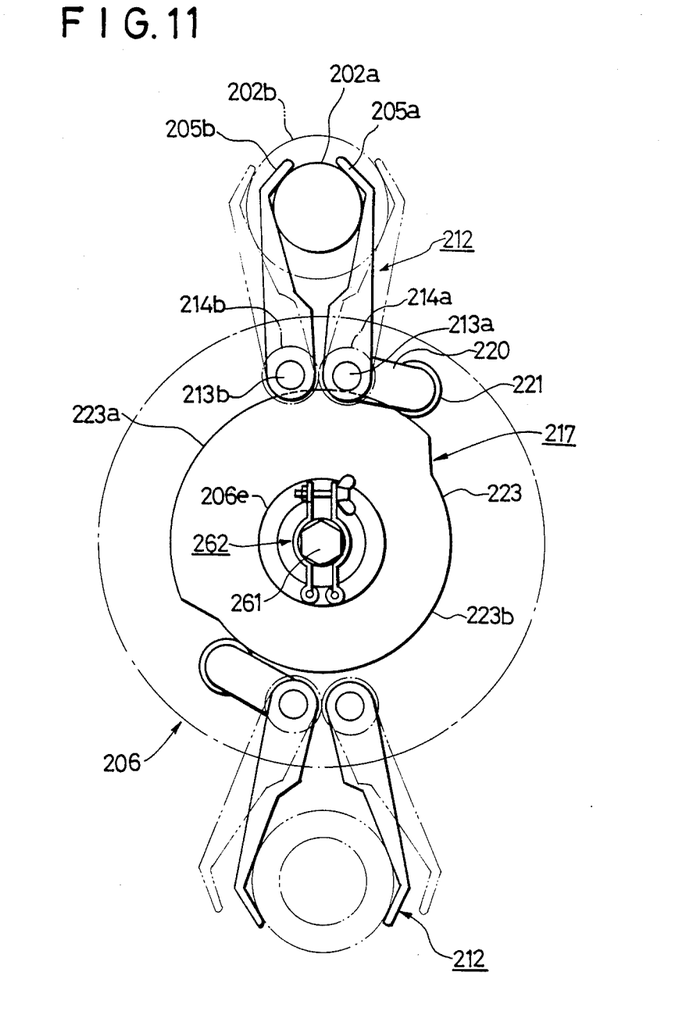
FIG. 11 is a top view of part of FIG. 10.

FIGS. 10 and 11 show a third embodiment of the invention in which the strokes of the pair of clamp arms may be modified by means other than the cam mechanism 17 or 117 mentioned above.

Specifically, in this embodiment, a rotatable body 206 comprises a lower disc 206b which is fixedly mounted on the top end of a rotary shaft 210, and a cylindrical portion 206d extending upward is formed in the axial portion of the disc 206b. An upper disc 206a is formed with a cylindrical portion 206e in its axial portion which depends downwardly, and the cylindrical portion 206e is vertically movable along the cylindrical portion 206d in surrounding relationship therewith, with a key member 260 disposed between the cylindrical portions to prevent a relative rotation therebetween while allowing the cylindrical portion 206e to move up and down relative to the cylindrical portion 206d.

Rotatably journalled in the upper disc 206a is a threaded shaft 261, which is in turn threadably engaged with the cylindrical portion 206d, thus allowing the upper disc 206a to move up and down relative to the lower disc 206b through the rotation of the threaded shaft 261. A free rotation of the threaded shaft 261 is prevented by stop means 262 mounted on the upper disc 206a which clamps around the periphery of the threaded shaft 261.

A pair of clamp shafts are rotatably mounted on the upper disc 206a. One of the clamp shafts, 213a, is in axial alignment with a second clamp shaft 215 which is rotatably mounted on the lower disc 206b. The upper end of the second clamp shaft 215 is sleeve-shaped to receive the lower end of the upwardly located, first clamp shaft 213a in a slidable and rotatable manner therein. A cam groove 263 is formed in the upper sleeve portion of the second clamp shaft 215 so as to be circumferentially displaced as it proceeds vertically doenward, and is engaged by a pin-shaped cam follower 264 mounted on the lower end of the first clamp shaft 213a, so that whenever the upper clamp shaft 213a moves up and down relative to the downwardly located, second clamp shaft 215, the engagement between the oblique cam groove 263 and the cam follower 264 is effective to angularly drive the first clamp shaft 213a with respect to the second clamp shaft 215.

A rocking lever 220 is mounted on the second clamp shaft 215, and is urged by a return spring 222 for rotation in one direction, with a cam follower 221 disposed on the rocking lever 220 maintained in engagement with a cam surface defined on the outer periphery of a cam member 223. As in the previous embodiment, the cam member 223 includes an arcuate portion 223a of an increased diameter and an arcuate portion 223b of a reduced diameter. The arcuate portion 223a of an increased diameter is effective to cause the cam follower 221 to be displaced radially outward to close the clamp arms 205a, 205b while the arcuate portion 223b of a reduced diameter is effective to open the clamp arms 205a, 205b.

In other respects, the arrangement is similar to that of the first embodiment mentioned above, and accordingly corresponding parts are designated by like reference numerals as used in the latter, to which 200 is added.

Thus, with this arrangement, when transferring a vessel 202a having a reduced height and a small diameter, the threaded shaft 261 is rotated to lower the upper disc 206a to a given elevation. This simultaneously lowers the clamp shaft 213a which is mounted on the upper disc 206a, whereby the engagement between the oblique cam groove 263 and the cam follower 264 is effective to cause the upper clamp shaft 213a to rotate with respect to the downwardly located second clamp shaft 215 which is maintained at a given angular position by means of the return spring 222. As a consequence, the pair of clamp arms 205a, 205b which are mounted on the upwardly located clamp shaft 213a and a clamp shaft 213b which forms a pair therewith are positioned at an elevation which is adequate for vessels having a reduced height. In addition, the opening angle defined between the clamp arms 205a, 205b is adjusted to an angle which is adequate to the size of such vessel having a reduced diameter.

By contrast, when transferring a vessel 202b having an increased height and an increased diameter, the threaded shaft 261 is rotated in opposite direction to raise the upper disc 206a to a given elevation. This also raises the clamp shaft 213a in integral manner with the disc 206a, whereby the engagement between the oblique groove 263 and the cam follower 264 is effective to angularly drive the upwardly located clamp shaft 213a in the opposite direction from before with respect to the downwardly located second clamp shaft 215 which is maintained at a given angular position by means of the return spring 222.

Consequently, the pair of clamp arms 205a, 205b mounted on the clamp shafts 213a, 213b are positioned at an elevation corresponding to a vessel having an increased height, and the opening angle defined between the both clamp arms 205a, 205b is adjusted to an angle which is adequate to the size of a vessel having an increased diameter.

Thus, with this embodiment, if the height and the diameter of vessels are changed, they can be grasped at an optimum grasp position which depends on the size of the vessels, allowing a stabilized transferring operation for the vessels to be maintained.

While the clamp arms 205a, 205b are driven up and down in accordance with the height of vessels in the present embodiment, where such movement is not required, the lower disc 206b may be moved up and down instead. In this instance, the thickness of the cam member 223 may be increased to prevent its engagement if the cam follower 221 moves up and down. Alternatively, the cam member 223 may be disposed on the frame 208 so as to be vertically movable so that it may be moved up and down as the cam follower 221 moves up and down.

Figure 12:
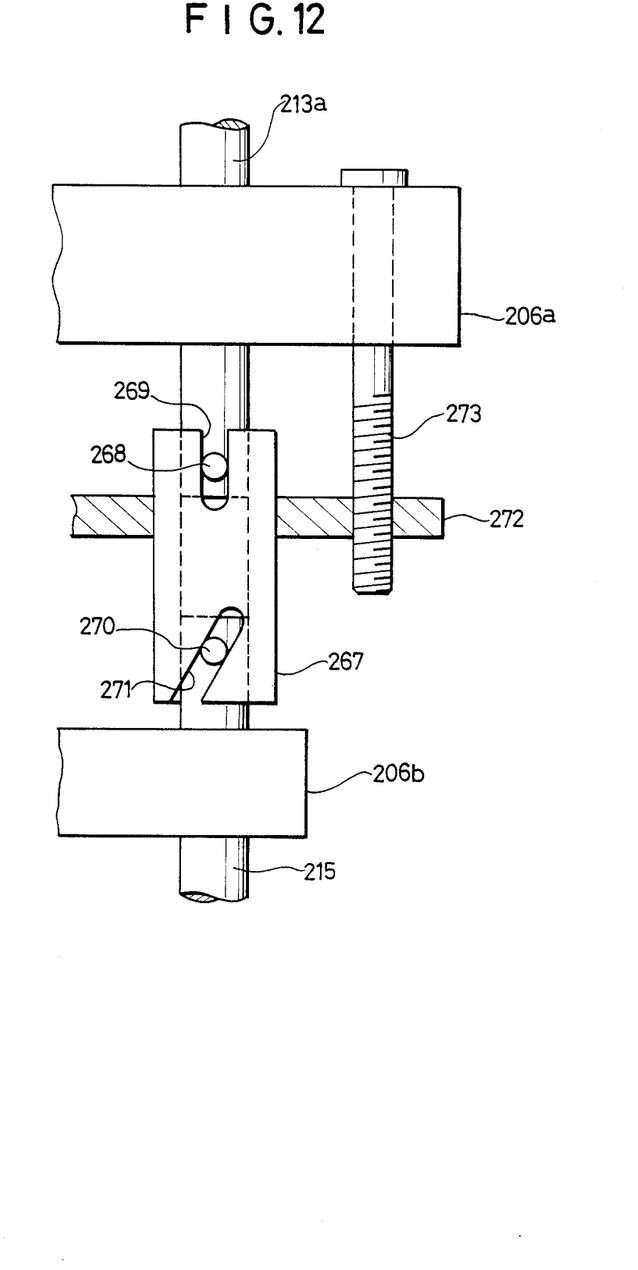
FIG. 12 is a cross-sectional view of a part shown in FIG. 10, illustrating a modification thereof.

FIG. 12 shows a modification. A third, hollow clamp shaft 267 may be disposed in surrounding relationship with the upwardly located clamp shaft 213a and the downwardly located second clamp shaft 215 so as to be rotatable and vertically movable. The third clamp shaft 267 is formed with a vertically extending cam groove 269 which is engaged by a pin-shaped follower 268 mounted on the first clamp shaft 213a, and is also formed with an obliquely extending cam groove 271 which is engaged by another pin-shaped cam follower 270 mounted on the second clamp shaft 215. The third clamp shaft 267 is journalled on an elevating plate 272 to allow its rotation alone, and a threaded shaft 273 which is journalled in the upper disc 206a is threadably engaged with the threaded shaft 273 so that the rotation of the threaded shaft 273 is effective to move the elevating plate 272 and the third clamp shaft 267 up and down.

It will be apparent that with this arrangement, the opening angle of the clamp arms 205a, 205b may be ajudsted without causing a vertical movement thereof. In addition, if the upper disc 206a is arranged to be movable up and down in the present embodiment, both the opening angle and the elevational position of the clamp arms 205a, 205b may be separately adjusted.

While the invention has been disclosed above in connection with several embodiments thereof, it should be understood that the above disclosure is exemplary only and that a variety of changes, modifications and substitutions therein will readily occur to one skilled in the art without departing from the spirit and scope of the invention defined by the appended claims.

What is claimed is:

1. An article transfer apparatus with clamper including a frame, a rotatable body which is rotatably mounted on the frame, a pair of clamp shafts rotatably mounted on he rotatable body for rotation in opposite directions from each other, said clamp shafts being carried along a path of travel by said rotatable body, a pair of clamp arms mounted on respective clamp shafts for swinging motion, clamp arm swing means for causing a swinging motion of the clamp arms, the arrangement being such that a vessel grasped by the pair of clamp arms may be transferred as the rotatable body rotates; wherein the clamp arm swing means includes a cam mechanism which comprises a rocking lever mechanically coupled with the clamp shafts, a cam follower mounted on the rocking lever, and a cam member mounted on the frame, the cam follower being disposed for engagement with a cam surface on the cam member to cause a rocking motion of the rocking lever in accordance with a cam profile to cause a rotation of the clamp shafts to drive the pair of clamp arms for swinging motion, further including an adjusting mechanism for causing said swinging motion of the pair of clamp arms to occur only at selected locations on said path of travel, said clamp arms including means defining a pair of opposed V-shaped surfaces for holding a circular vessel positioned therebetween such that the geometric center of the vessel is, regardless of the diameter thereof, coincident with a point of intersection of respective bisectors of said V-shaped surfaces, said clamp arms defining an opening angle therebetween for receiving the circular vessel, the location of said bisector intersection point being dependent on said opening angle, the size of said opening angle and the corresponding location of said bisector intersection point varying with said swinging motion of said clamp arms to permit holding circular vessels of various diameters, said opening angle having a critical value at which said bisector intersection point is closest to said clamp shafts, said bisector intersection point being further from said clamp shafts at all other operative values of said opening angle whether greater or less than said critical value.

2. An article transfer apparatus according to claim 1 in which the cam surface of the cam member is conical, with the cam follower being engaged with said conical cam surface, the adjusting mechanism comprising an elevating mechanism for causing the cam member to move up and down.

3. An article transfer apparatus according to claim 2 in which the elevating mechanism comprises a rotatable threaded shaft which is vertically disposed and which is in threadable engagement with the cam member.

4. An article transfer apparatus according to claim 1 in which at least two of the cam members are provided, with each cam member being rotationally displaceable relative to each other in circumferential direction of the rotatable body, the cam follower being engaged with the cam surfaces of the both cam members in common, the adjusting mechanism comprising rotational drive means which causes a rotational displacement of the cam members relative to each other.

5. An article transfer apparatus with clamper including a frame, a rotatable body which is rotatably mounted on the frame, a pair of clamp shafts rotatably mounted on the rotatable body for rotation in opposite directions from each other, said clamp shafts being carried along a path of travel by said rotatable body, a pair of clamp arms mounted on respective clamp shafts for swinging motion, clamp arm swing means for causing a swinging motion of the clamp arms, the arrangement being such that a vessel grasped by the pair of clamp arms may be transferred as the rotatable body rotates; wherein the clamp arm swing means includes a cam mechanism which comprises a rocking lever mechanically coupled with the clamp shafts, a cam follower mounted on the rocking lever, and a plurality of cam members mounted on the frame, the cam follower being disposed for engagement with respective cam surfaces defined on the cam members to cause a rocking motion of the rocking lever in accordance with a cam profile to cause a rotation of the clamp shafts to drive the pair of clamp arms for swinging motion, further including an adjusting mechanism for causing said swinging motion of the pair of clamp arms to occur only at selected location son said path of travel, said cam members being rotationally displaceable relative to each other in circumferential direction o the rotatable body, the cam follower being engaged with the cam surfaces of the both cam embers in common, the adjusting mechanism comprising rotational drive means which causes a rotational displacement of the cam members relative to each other, including a first cam follower mounted on one of the cam members, a second cam follower mounted on the other cam member, a spring for urging the both cam members for rotation in opposite directions from each other to drive the first and the second cam followers toward each other, and a third cam member which is triangular in section and disposed to be movable to wedge between and out from between the both cam followers.

6. An article transfer apparatus according to claim 5 in which the third cam member is disposed on a movable plate which is rotationally displaceable in the circumferential direction of the rotatable body and which is also reciprocable in the axial direction of the rotatable body, further including positioning means for positioning the movable plate at a given anglular position.

7. An article transfer apparatus according to claim 1 in which the clamp shaft is divided into a plurality of clamp shaft sections including at least a clamp shaft section immediately associated with the clamp arm and another clamp shaft section immediately associated with the rocking lever, with clamp shaft sections which are disposed immediately adjacent to each other being disposed to permit their axial displacement relative to each other, the adjusting mechanism comprising reciprocatory drive means for causing an axial displacement of the clamp shaft sections and cam means for causing a rotational displacement of the both clamp shaft sections in response to a relative axial displacement of the both clamp shaft sections.

8. An article transfer apparatus according to claim 7 in which one of the clamp shaft sections which are capable of displacement relative to each other is formed with a cylindrical portion which is formed with a cam groove extending obliquely with respect to the axial direction, the other clamp shaft section being fitted into the cylindrical portion and carrying a cam follower which engages the cam groove.

9. An article transfer apparatus according to claim 7 in which a third clamp shaft section is disposed in surrounding relationship with an upwardly located and a downwardly located clamp shaft section so as to be both vertically movable up and down and rotatable, the third clamp shaft section being formed with a cam groove in its top portion which is engaged by a cam follower mounted on the upwardly located clamp shaft section, the third clamp shaft section being formed with another cam groove in its bottom portion which is engaged by a cam follower mounted on the downwardly located clamp shaft section, the reciprocatory drive means driving the third clamp shaft section to move up and down.

* * * * *

UNITED STATES PATENT AND TRADEMARK OFFICE
CERTIFICATE OF CORRECTION

PATENT NO. : 4 984 680
DATED : January 15, 1991
INVENTOR(S) : Itirou Hamano

It is certified that error appears in the above-identified patent and that said Letters Patent is hereby corrected as shown below:

```
Column 12, line 30;   change "he" to ---the---.
Column 13, line 43;   change "location son" to
                      ---locations on---.
Column 13, line 45;   change "o" to ---of---.
Column 13, line 47;   change "embers" to ---members---.
```

Signed and Sealed this

Thirteenth Day of October, 1992

*Attest:*

DOUGLAS B. COMER

*Attesting Officer*      *Acting Commissioner of Patents and Trademarks*